Dec. 20, 1932.  E. C. WRIGHT  1,891,861
DEVICE FOR BENDING TUBES, PIPES, AND THE LIKE
Filed Dec. 15, 1930  2 Sheets-Sheet 1
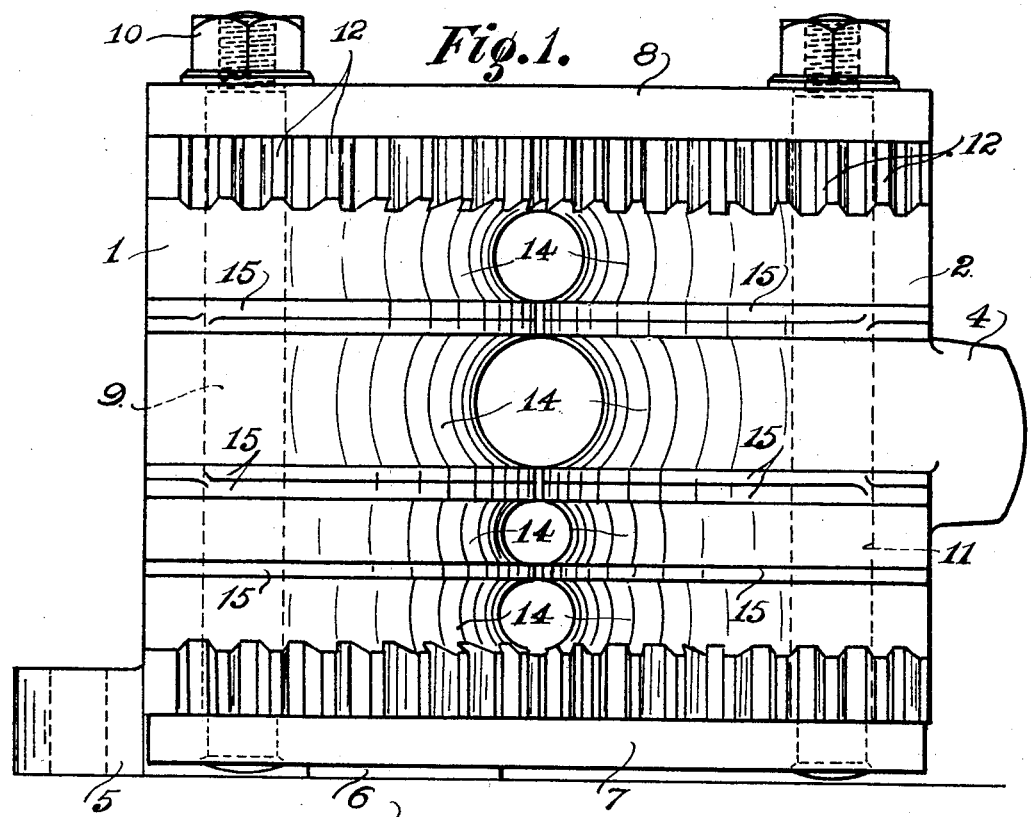
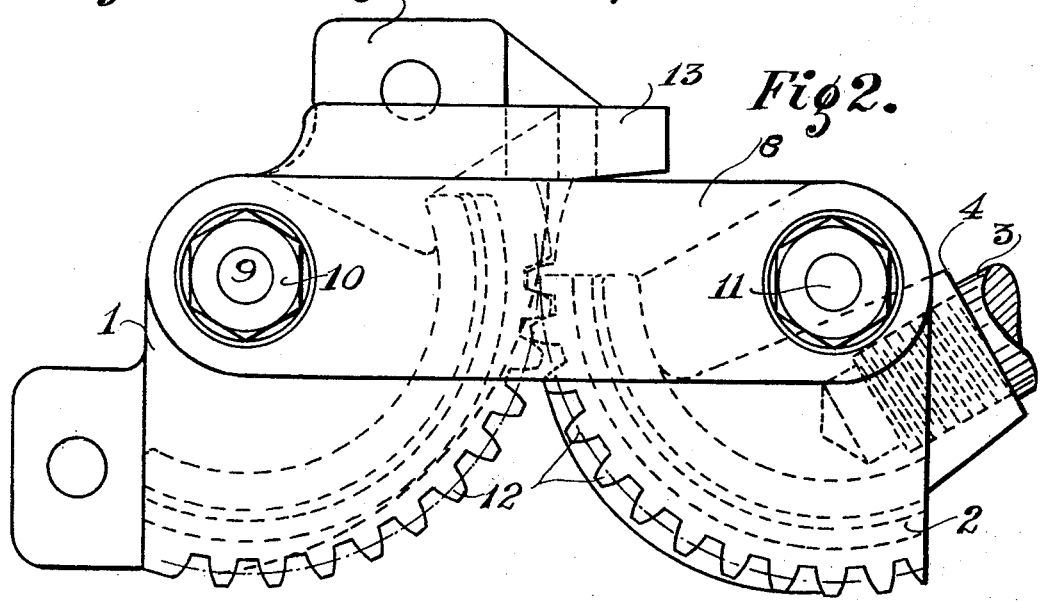
INVENTOR.
Ernest Charles Wright
PER Rayner & Co.
ATTORNEYS.

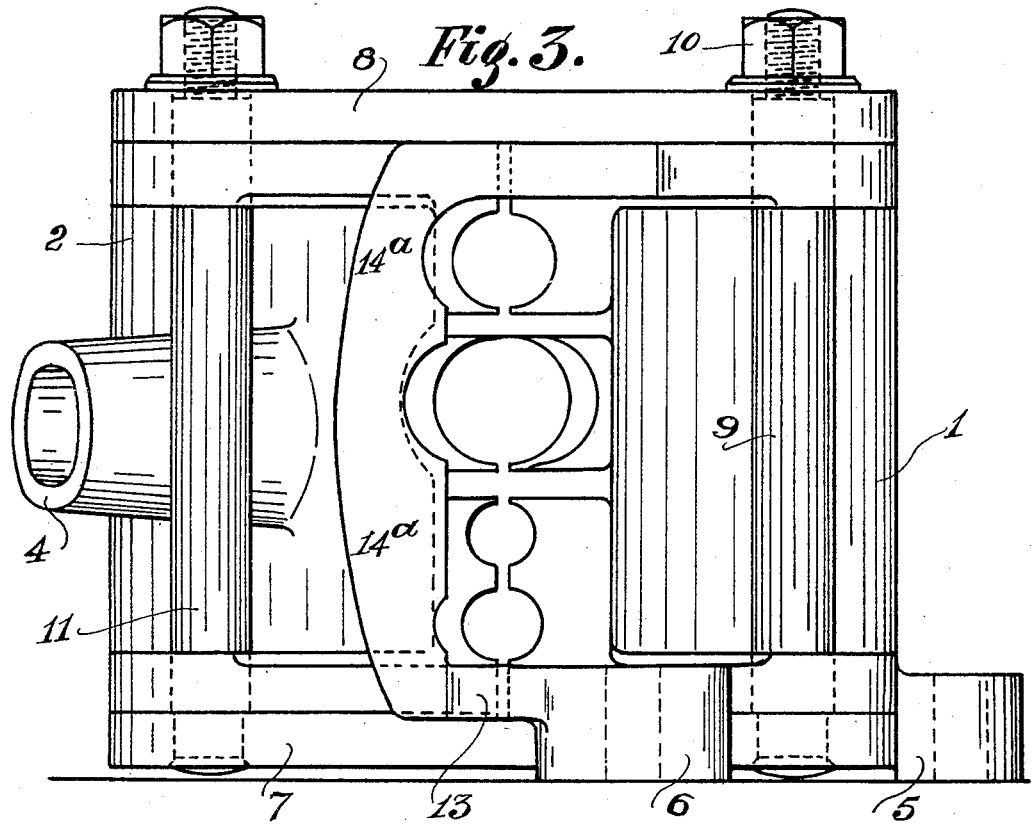
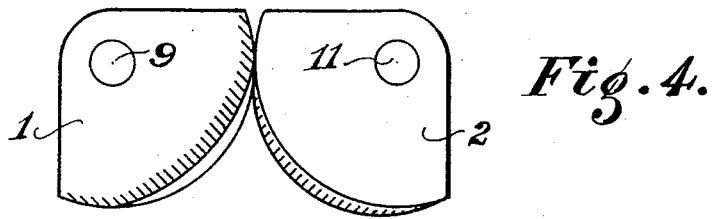
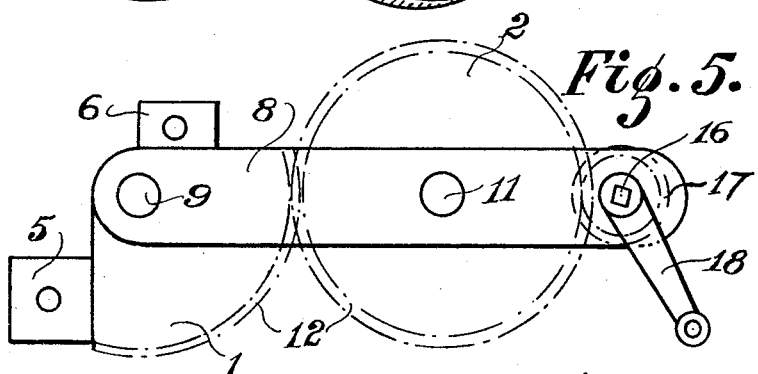

Patented Dec. 20, 1932                                                               1,891,861

UNITED STATES PATENT OFFICE

ERNEST CHARLES WRIGHT, OF BELVEDERE, ENGLAND

DEVICE FOR BENDING TUBES, PIPES, AND THE LIKE

Application filed December 15, 1930, Serial No. 502,501, and in Great Britain January 14, 1930.

The object of my invention is to provide a device whereby pipes, tubes and other bendable members of a like nature may be readily bent to a desired curvature by hand. A further object of my invention is to provide with such a device means whereby pipes, tubes and rods of different diameters can be dealth with, and also in which by the exercise of a simple form of operation a bend of considerable length and radius can be formed.

Broadly a device for the purpose set forth according to my invention is characterized by two opposed arcuate bending surfaces one of which is adapted to generate a substantially part planetary movement along the other, the opposing surfaces being adapted to receive between them the member to be bent.

In the preferred form of my invention I employ two curved segments coupled together by links extending between their pivots about which they are adapted to turn relatively to each other. Suitable grooves are provided around the curved peripheries of one or both segments so that the grooves in the segments form a substantially circular or other suitably shaped opening through which the pipe engages. One of the segments may be provided with a stop for holding the pipe and is preferably provided with one or more brackets, lugs or other means for mounting the apparatus upon a bench or other fixture or for securing it in a vice. One of the segments is provided with a handle or lever or suitable gearing by means of which one of the two segments may be turned about its axis for the purpose of bending a pipe or tube located in one of the spaces or grooves between them.

In a convenient construction of my portable bending device for gas, water, steam or other pipes, I employ two segments of cast iron or other suitable material one of which is provided with lugs or brackets by means of which it may be mounted upon the bench or other fixture. This segment is also provided with a stop for holding the pipes and may consist of a plate extending along one edge and projecting beyond the curved periphery. Each segment is provided with a suitable number of grooves each of substantially semicircular form and arranged in pairs opposite to each other. The grooves may vary in size corresponding to the outside diameter of the pipes to be bent therein. The plate or stop provided upon one segment has a corresponding series of holes through which the pipe is inserted into the grooves and acts as a stop to hold the pipe against movement during the bending operation.

The two segments are each provided with a shaft passing through their centre and the shafts may take the form of a suitable nut and bolt. The two shafts are coupled together by a pair of links so as to hold the two segments in correct relationship to each other whilst permitting them to turn about their shafts which may be concentric with their curved peripheries. Suitable gear teeth are formed around the periphery of both segments and are arranged to mesh with each other. A suitable toothed segment is preferably provided at each side of each segment, and these toothed segments gear together so that when one segment is turned about its axis it will also travel round the axis of the other segment owing to the meshing of the gear teeth. The ratio of the toothed gears is preferably such as to obtain a substantially true rolling effect. The gear teeth may be cut or formed in plates attached to the grooved segments. A suitable handle or lever which may take the form of a rod of suitable length is fixed in any desired manner to one segment and in one form may conveniently be screwed into a boss provided thereon.

In order that my invention may be clearly understood and readily carried into effect I have appended herewith two sheets of drawings illustrating two embodiments thereof and wherein:—

Fig. 1 is a front elevation view showing a pair of substantially quarter cylindrical bending bodies meshing with each other.

Fig. 2 is a plan view of Fig. 1.

Fig. 3 is a rear elevation view.

Fig. 4 is a diagrammatic plan view showing a method of providing bending surfaces having greater radii than that of the segmental bodies on which they are formed.

Fig. 5 is a diagrammatic plan view showing a method of obtaining increased power at the bending surfaces by the use of a reduction gear.

Referring to Figs. 1, 2 and 3 of the drawings I have shown a device for dealing with different diameters of tubes, rods and the like and in which a solid substantially quarter cylindrical metal body 1 is adapted to be held stationary and a further like body 2 with its arcuate surface directed towards the arcuate surface of the other body 1 is adapted to be traversed about the centre of the body 1 and turned on its own axis by means of a lever 3 which can be firmly secured to the part cylindrical body 2 by being threaded into a socket 4 formed integral with one radial side of the body, the lever 3 preferably being inclined rearwards relative to the body 2 so as to obtain the greatest leverage during a bending operation.

The body 1 is fixed to a bench or elsewhere by a pair of corner located lugs 5 and 6 apertured to receive securing bolts or screws, or formed with or forming parts of bench clamps. These lugs extend from the lower end of the body 1 and project beneath the base of the body 1 as shown in Fig. 1 to provide a space beneath such body for the reception of the lower of a pair of parallel links 7 and 8 located respectively below and above the body 1 and both pivoted to a common bolt 9 passed through a hole formed along the axis of the body 1. The lower end of the bolt 9 can be riveted over the lower face of the link 7 and the upper end can have a nut 10 threaded on to it.

The links 7 and 8 extend beyond the axis of the translatably movable body 2 and also receive a bolt 11 similar to the bolt 9 passed through an axial hole in the body 2. The links 7 and 8 so connect the bodies 1 and 2 that the body 2 is made to move in a substantially part planetary path about the body 1, and a positive movement of the body 2 without any slip between it and the body 1 is ensured by forming on the upper and lower ends, or only one end of the two bodies gear teeth 12 constantly in mesh during operative movement of the body 2. The body 1 is formed with a radial or lateral stop 13 at one end of its arcuate surface which forms an abutment to limit the rearward movement of the body 2, its inner face being inclined the necessary amount to enable the rear end of the arcuate surface of the body 2 to clear it at the commencement of the operation.

The arcuate surfaces of the bodies 1 and 2 are formed with one or more arcuate sections or other suitable section channels 14 extending in parallel circumferential directions. It is preferred to have a number of pairs of these channels 14 as shown, and of different depths or radii whereby pipes and rods of different diameters can be dealt with by a single apparatus. The parts 15 of the arcuate surfaces of the body 1 which separate the channels nearly contact with the like parts of the body 2 and the channels 14 in the two bodies are substantially symmetrical in their dimensions and positions. However in order to deal with or to generate bends of greater radii than the radius of either of the bodies 1 and 2, one or more of the channels 14 can each be generated on a curve which is eccentric with the axis of the body in which it is formed. This is more clearly shown in Fig. 4 in which I have shown a section through one pair of channels 14 and in which the edges 15 are concentric with the axes of the bodies 1 and 2, but in which the two opposing channels 14 are struck to a greater radius. This arrangement also facilitates dealing with lengths of tubing or the like which are to be bent to a wide arc, this being effected by introducing one end of the tube and bending it slightly between the two bodies 1 and 2 and subsequently feeding the tubing gradually between the two bodies by a succession of movements each of which represents a length of tubing which is bent slightly in continuity of the preceding portion.

If desired the translatably movable body 2 can be adapted to be moved backwards and forwards along the periphery of the part cylindrical body 1 by positively applying a drive to the body 2 for instance as shown in Fig. 5 by forming the body 2 as a complete cylinder and extending the two links 7 and 8 beyond the axis of the body 2 to support a vertical spindle 16 fitted with gear wheels 17 and handle 18 and meshing with the teeth 12 formed completely around the upper and lower ends of the body 2.

The projection 13 of the body 1 can form a stop or abutment for a tube or the like located between the two segments or bodies 1 and 2 and for this purpose can extend across the space occupied by the channels 14 at the rear ends of the said two bodies, such projection 13 being formed with openings 14a adapted to register with the channels 14.

The bodies 1 and 2 can be recessed in their rear faces to reduce the amount of metal required for their production, whereby as seen in Fig. 3 the bolts 10 and 11 are exposed.

In operation one of the segments or bodies is suitably fixed to a bench or otherwise supported. The pipe to be bent is passed through an opening 14a in the stop plate 13 and projections between the two segments engaging in the grooves therein which correspond to the diameter of the pipe. The handle 18 or lever 3 on the free segment 2 is then moved so as to turn it about its centre. Rotation of this segment 2 about its centre will cause it to travel round the axis of the other fixed segment 1 owing to the engagement of the gear teeth on it. In its movement the projecting end of the pipe will be forced to bend round the fixed segment and the actual part being bent will at all times throughout the operation be located in the curved groove between the two segments so as to maintain the correct shape of the pipe during bending. The operation may be quickly effected and a true bending of the pipe will be obtained without flattening of the section on the bend.

I claim:—

1. Apparatus for bending tubes, pipes and the like comprising two bodies, each having an arcuate surface, the two arcuate surfaces being substantially symmetrically opposed and contiguous to each other, a positive driving connection between said two bodies and means for moving one of said bodies about the axis of the arcuate surface of the other whereby said driving connection produces a substantially planetary movement of the movable body, and a circumferential channel in one of said surfaces and having a radius greater than the radius of the body containing it.

2. Apparatus for bending tubes, pipes and the like comprising a part cylindrical body, a number of circumferentially directed channels in its curved surface, means for affixing the said body fixedly to a supporting surface, another part cylindrical body, a link connecting the axes of the two bodies and movable about the axis of the first mentioned body, gear teeth in the curved surfaces of the two bodies meshing with each other, a gear wheel fixed to said movable body, a rotary gear wheel meshing therewith, and a handle connected to said latter gear wheel, said channels being struck to radii greater than the radii of their respective part cylindrical bodies.

ERNEST CHARLES WRIGHT.